Feb. 16, 1954 H. C. DILL ET AL 2,669,432
ROLLER CUTTER
Filed Oct. 17, 1949

Herbert C. Dill
William H. Lyne
Robert W. Schlumpf
INVENTORS

BY Ray L. Smith
ATTORNEY

UNITED STATES PATENT OFFICE 2,669,432

ROLLER CUTTER

Herbert C. Dill, William H. Lyne, and Robert W. Schlumpf, Houston, Tex., assignors to Hughes Tool Company, Houston, Tex., a corporation of Delaware Application October 17, 1949, Serial No. 121,728

3 Claims. (Cl. 255—347)

This invention relates to cutters for earth formations, and more particularly to rotary cutters used on bits for drilling earth bores to formations containing oil, gas, water, sulphur, and the like.

Efforts have been made to provide cutters for drill bits with teeth having a maximum resistance to wear, and at the same time capable of retaining optimum cutting characteristics as wear occurs. Common practice, in an effort to accomplish desired results, is to apply a hardfacing material, such as tungsten carbide, upon the surface to be protected from wear. Such practice leaves much to be desired inasmuch as considerable labor is necessary to apply the hardfacing material and the resulting structure fails to provide adequate resistance to abrasion that long life and efficient cutting action are obtained.

It is an object of the invention to provide a cast roller cutter having cutting elements integral therewith and embodying wear resistant inserts so that such inserts effect desired cutting action and the surrounding metal, bonded thereto, acts as a carrier.

Another object is to provide a cast roller cutter having wear resistant inserts in the cutter elements thereof, such inserts being initially completely enclosed within the cast metal and integrally bonded thereto. Still another object is to provide a roller cutter having wear resistant inserts so positioned in the cutting elements thereof that a self-sharpening of the cutter elements is effected during the normal use of the cutter.

A still further object is to provide a roller cutter that will have efficient cutting action over a long and useful life.

Still another object is to provide a roller cutter having cutter elements or teeth that are self-conforming or, in other words, capable of maintaining their general original shape throughout their useful life.

The invention also comprehends the provision of roller cutters having in the cutter elements thereof wear resistant inserts which are substantially free from locked-in stresses.

The foregoing objects, together with other objects, will be more fully apparent from the following description considered in connection with the accompanying drawings, in which.

The invention comprehends the use, in roller cutters, of compacts, or inserts, of wear resistant material. Preferably, such inserts are so-called sintered carbides, produced in accordance with known methods by mixing particles of a carbide and a matrix metal and then causing an integration thereof into a solid body by application of high pressure and temperature. Sintered tungsten carbide inserts may be, and preferably are used, but it is to be understood that such material is mentioned as illustrative and not by way of limitation of the invention.

Figure 1:
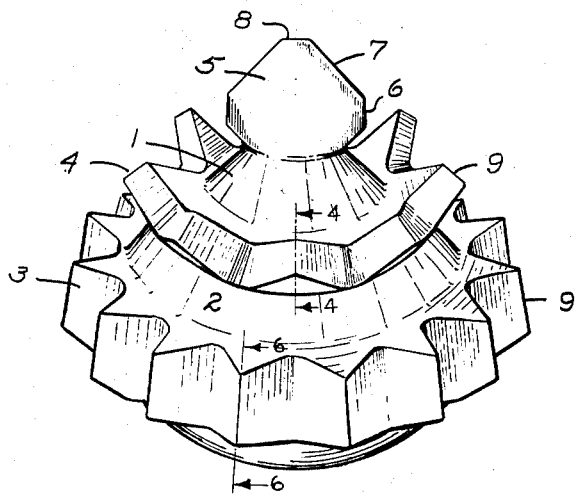
Fig. 1 is a perspective view of a cone type roller cutter embodying the invention.

Cone cutters of the type shown at 1 in Fig. 1, for purposes of illustration, normally comprise a body or shell 2 having a row of heel teeth 3 proximate the base of the shell. Inwardly, toward the point of the cone, is a second or intermediate row of teeth 4. In a two- or three-cone bit, at least one of the cones has still another row of teeth inwardly of the row 4, but the cone, or cutter, shown in the drawing is provided with a spearpoint, or nose cutter element 5, having cutting edges 6, 7 and 8 thereon. The teeth of rows 3 and 4 are chisel-shaped and have cutting edges 9 thereon. It is intended that the cone 1 and cooperating cones, or other shaped cutters, cooperating therewith in a drill, shall cut the entire bottom of the hole and in this manner disintegrate the bottom to progressively form the desired earth bore.

Figure 9:
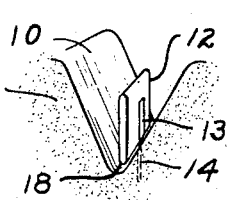
Fig. 9 is a fragmentary view illustrating the manner of positioning the wear resistant inserts within a mold so that the inserts will be desirably positioned in the cutter elements of the cutter cast within the mold.

The cone 1, and the teeth thereon, are cast, the teeth and spearpoint being formed by providing cavities in the casting mold as shown at 10 in Fig. 9. An important feature of the invention is the provision in the various cutting elements of wear resistant inserts in such manner that these inserts are integrally united to such elements and serve to effectively resist wear as they produce cutting action in cooperation with the surrounding metal.

It should be noted that drill bits having roller cutters are frequently subjected to vertical thrusts of many thousands of pounds to induce cutting action. The strain to which the cutters are subjected is augmented by impacts arising in normal drilling operations. Furthermore, materials possessing high resistance to wear are unusually relatively frangible and it is therefore imperative that the wear resistant inserts shall be so utilized and anchored in cutting position that advantage is taken of their relatively high compressive strength while shattering is prevented.

In the fragmentary view of Fig. 9, the sand mold is shown at 11 and the cavity 10 therein is intended to receive molten metal to form a cast tooth or cutting element. A wear resistant insert is shown at 12 intermediate the ends of the cavity. This insert is preferably to be completely enclosed within the metal of the cast tooth, and hence must be held upstanding within the cavity 10 and spaced from the sides or bottom thereof. To this end, we provide a metal holder 13 which is secured to the insert, as by welding, this holder having a sideward prong 14 which penetrates the wall of the mold 11. It is desirable that the holder 13 be of substantially the same chemical composition as the metal that is cast to form the cutter and to bond with the wear resistant inserts 12. While the insert 12 is preferably completely enclosed or encased within the cast tooth, the insert may be positioned at the bottom of the cavity 10 so that its edge 18 will not be covered by cast metal and will initially serve as cutting edge when the cutter is put in use.

A complete mold comprises a principal cavity having the smaller cavities 10 to provide for the formation of teeth 3 and 4 and the spearpoint 5. We prefer that a mold thus prepared, and with wear resistant inserts positioned as above explained, be rotated about the axis of the principal cavity while molten metal is poured to fill the mold. It is to be understood, of course, that static or other well-known techniques of casting may be relied upon without departing from the invention.

Figure 2:
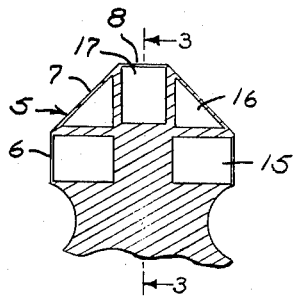
Fig. 2 is a sectional view through the nose element or spearpoint of the cone of Fig. 1 showing the location of wear resistant inserts therein.
Figure 3:
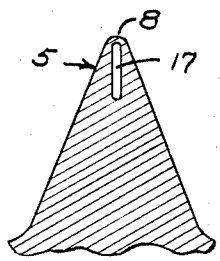
Fig. 3 is a sectional view taken at right angles to that of Fig. 2 and is taken on line 3—3 of Fig. 2.

Fig. 2 shows the spearpoint 5 as having side inserts 15, tapered inserts 16 and an end insert 17 to provide desired cutting edges 6, 7 and 8. While two or more of these inserts may be integrated into a single insert, the arrangement shown is preferable, particularly in view of the fact that, as already pointed out, the material comprising such inserts is usually quite frangible.

Figure 4:
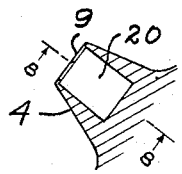
Fig. 4 is a sectional view similar to that of Fig. 2, but showing the position of a wear resistant insert in one of the teeth of the rows of teeth outwardly from the spearpoint. The view is taken on line 4—4 of Fig. 1.
Figure 5:
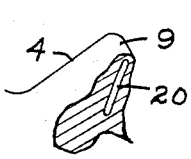
Fig. 5 is a perspective view, partly in section, further illustrating the position of the wear resistant insert in a cutter element or tooth.
Figure 6:
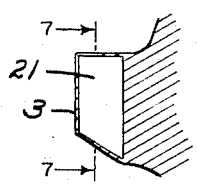
Fig. 6 is a sectional view through a heel tooth on the cutter shown in Fig. 1, the view being taken on line 6—6 thereof.
Figure 7:
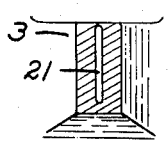
Fig. 7 is a sectional view taken on line 7—7 of Fig. 6.

Figs. 4 and 5 show the preferred manner of placing wear resistant inserts in the teeth 4. Such inserts 20 are substantially rectangular in shape and attention is directed to the fact that each surface thereof is spaced from the outer surface of the tooth 4 or the cutting edge 9 thereof. In a similar manner, the insert 21 of the teeth 3 of the heel row is so positioned within the tooth that it is completely encased within the cast metal forming the body of the tooth.

Figure 8:
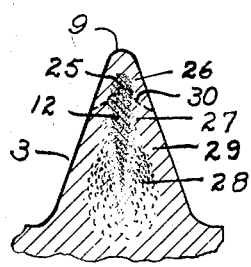
Fig. 8 is an enlarged sectional view through a cutter element showing the nature of the bonding between the wear resistant insert and the metal cast therearound.

Fig. 8 shows a section through a tooth, indicated as 3, and illustrates the metallurgical condition in a tooth produced in accordance with the invention. The initial cutting edge of the tooth is shown at 9 and inwardly therefrom is the wear resistant insert of which the portion 25 is substantially unaffected by the casting operation. Near the edge 9 there is a narrow zone 26 forming the bond between the insert and the cast metal. Toward the inner end of the insert there are transitional zones 27 and 28 of varying composition composed of a mixture of the various elements present in the insert and the adjacent steel. These transitional zones constitute an efficient bond between the insert 12 and the unaffected cast steel shown at 29. The word "bond" as herein used, and in accordance with the foregoing explanation of Fig. 8 of the drawings, is intended to mean a fusion bond wherein there is no interposed bonding material between the relatively soft and relatively tough cast metal 29 and the wear resistant insert 12, there being a transitional zone between the cast metal and the insert of varying composition and comprising a mixture of the various elements present in the wear resistant insert and the adjacent steel.

Obviously, the exposed edge of the insert 12 serves to provide a cutting edge which is extremely resistant to abrasion. It is desirably held in effective cutting position by the adacent metal fusion bonded thereto. Cutting efficiency is also enhanced by the fact that self-sharpening of the tooth or cutting element is effected since wear progresses as indicated by the line 30.

While the description of the invention has referred specifically to roller cutters of the cone type, it is intended that such reference be for purposes of illustration only inasmuch as the invention is equally applicable to cutters of disc, cylindrical or other configurations.

Broadly, the invention comprehends the provision of a roller cutter, for earth boring tools, having wear resistant inserts incorporated in the cutting elements of the cutter and fusion bonded thereto so that the objectives of the invention are attained.

We claim:

1. A roller cutter for earth boring tools made up of a cutter body and cutting elements integral therewith and wear resistant inserts substantially radially disposed in said cutting elements; wherein the inserts are composed of sintered carbide and wherein the cutter body and cutting elements comprise cast steel, said inserts being rigidly bonded to the cutting elements by interfusion of the metal of said elements with the inserts, whereby a zone of material, comprising alloys composed of the base metal and insert metal and varying in increasing and decreasing amounts of each metal from the metal to the insert, is provided between the cutting element and the insert.

2. A roller cutter for earth boring tools made up of a cutter body and cutting elements integral therewith and wear resistant inserts substantially radially disposed in said cutting elements; wherein the inserts are composed of sintered carbide and wherein the cutter body and cutting elements comprise cast steel, said inserts being rigidly bonded to the cutting elements by interfusion of the metal of said elements with the inserts, whereby a zone of material, comprising alloys composed of the base metal and insert metal and varying in increasing and decreasing amounts of each metal from the metal to the insert, is provided between the cutting element and the insert, said inserts being initially fully encased within the cutting elements but each having a surface adapted to be exposed during initial wear of the cutting elements and present a wear resistant cutting surface at all times during the wear of the cutting elements.

3. A roller cutter for earth boring tools made up of a cutter body and cutting elements integral therewith and wear resistant inserts substantially radially disposed in said cutting elements; wherein the inserts are composed of sintered carbide and wherein the cutter body and cutting elements comprise cast steel, said inserts being rigidly bonded to the cutting elements by interfusion of the metal of said elements with the inserts, whereby a zone of material, comprising alloys composed of the base metal and insert metal and varying in increasing and decreasing amounts of each metal from the metal to the insert, is provided between the cutting element and the insert, said inserts being substantially rectangular in cross section.

HERBERT C. DILL.
WILLIAM H. LYNE.
ROBERT W. SCHLUMPF.

References Cited in the file of this patent

UNITED STATES PATENTS

| Number | Name | Date |
|---|---|---|
| 1,909,975 | Mackey et al. | May 23, 1933 |
| 1,926,770 | Harris et al. | Sept. 12, 1933 |
| 2,168,060 | Catland | Aug. 1, 1939 |
| 2,234,273 | Pennington | Mar. 11, 1941 |
| 2,244,617 | Hannum | June 3, 1941 |
| 2,260,593 | Wittlinger et al. | Oct. 28, 1941 |